Feb. 9, 1960 F. M. DEMER ET AL 2,924,380

ELECTRONIC RECORD READER

Filed July 28, 1955 4 Sheets-Sheet 1

INVENTORS.
FREDERICK M. DEMER &
RALPH G. MORK
BY
Campbell, Brumbaugh, Free & Graves
their ATTORNEYS INVENTORS
FREDERICK M DEMER &
RALPH G. MORK
BY
Campbell, Brumbaugh, Free & Graves
their ATTORNEYS INVENTORS.
FREDERICK M. DEMER &
RALPH G. MORK
BY
Campbell, Brumbaugh, Free & Graves
their ATTORNEYS.

ELECTRONIC RECORD READER

Filed July 28, 1955 4 Sheets-Sheet 4

INVENTORS.
FREDERICK M. DEMER &
RALPH G. MORK
BY
Campbell, Brumbaugh, Free & Graves
their ATTORNEYS.

United States Patent Office 2,924,380

Patented Feb. 9, 1960

2,924,380

ELECTRONIC RECORD READER

Frederick M. Demer, Johnson City, and Ralph G. Mork, Vestal, N.Y., assignors to International Business Machines Corporation, New York, N.Y., a corporation of New York Application July 28, 1955, Serial No. 524,874

20 Claims. (Cl. 235—61.11)

This invention relates to a high speed record reader and, more particularly, to such apparatus for reading rapidly moving data bearing record cards.

The advantages gained by employing accounting machines using various forms of data bearing records multiply in accordance with the operational speed thereof. Such high speed accounting machines require readers capable of reliably and accurately obtaining information from records such, for example, as data bearing cards. The speed of these machines has, in many instances, been governed by the readers since devices have been developed which will convey records through the accounting machines at extremely high speeds.

Accordingly, it is an object of the present invention to provide apparatus for accurately and reliably reading rapidly moving data bearing records.

It is another object of the invention to provide apparatus for electronically scanning a rapidly moving record card to obtain the data stored thereon.

It is a further object of the invention to provide for high speed scanning of selected columns of index points on rapidly moving data bearing record cards.

It is still another object of the invention to provide for the scanning of rapidly moving record cards by a light ray which transfers the data stored on the card to light sensitive means.

These and further objects of the invention may be accomplished by providing a reading cathode ray tube for furnishing a ray of light to scan each one of a sequence of rapidly moving record cards carrying data stored at index points arranged in groups.

To permit use of the pulses produced by the reading tube in conventional counters, further reference pulses must be provided each time the reading beam traverses an index point. Therefore, as each group is scanned, means are provided to generate reference pulses corresponding to each of the index points.

In one embodiment of the present invention, a pulse generating cathode ray tube, provided with a suitably constructed mask scanned by an electron beam, is employed for the generation of such reference pulses. In order to generate reference pulses at the proper intervals, means are provided to synchronize the scans of the reading and the reference pulse generating cathode ray tubes during each read tube sweep across the cards.

In a typical embodiment of the invention, a counter circuit producing an output voltage proportional to the count therein may be employed for shifting the scanning beam of the reading cathode ray tube from one to another selected group or column of index points. After the counter has received a predetermined number of input pulses, it furnishes a signal to place the reading system in condition to scan a further record.

These and further objects and advantages of the invention will be more readily understood when the following description is read in connection with the accompanying drawings in which.

Figure 1:
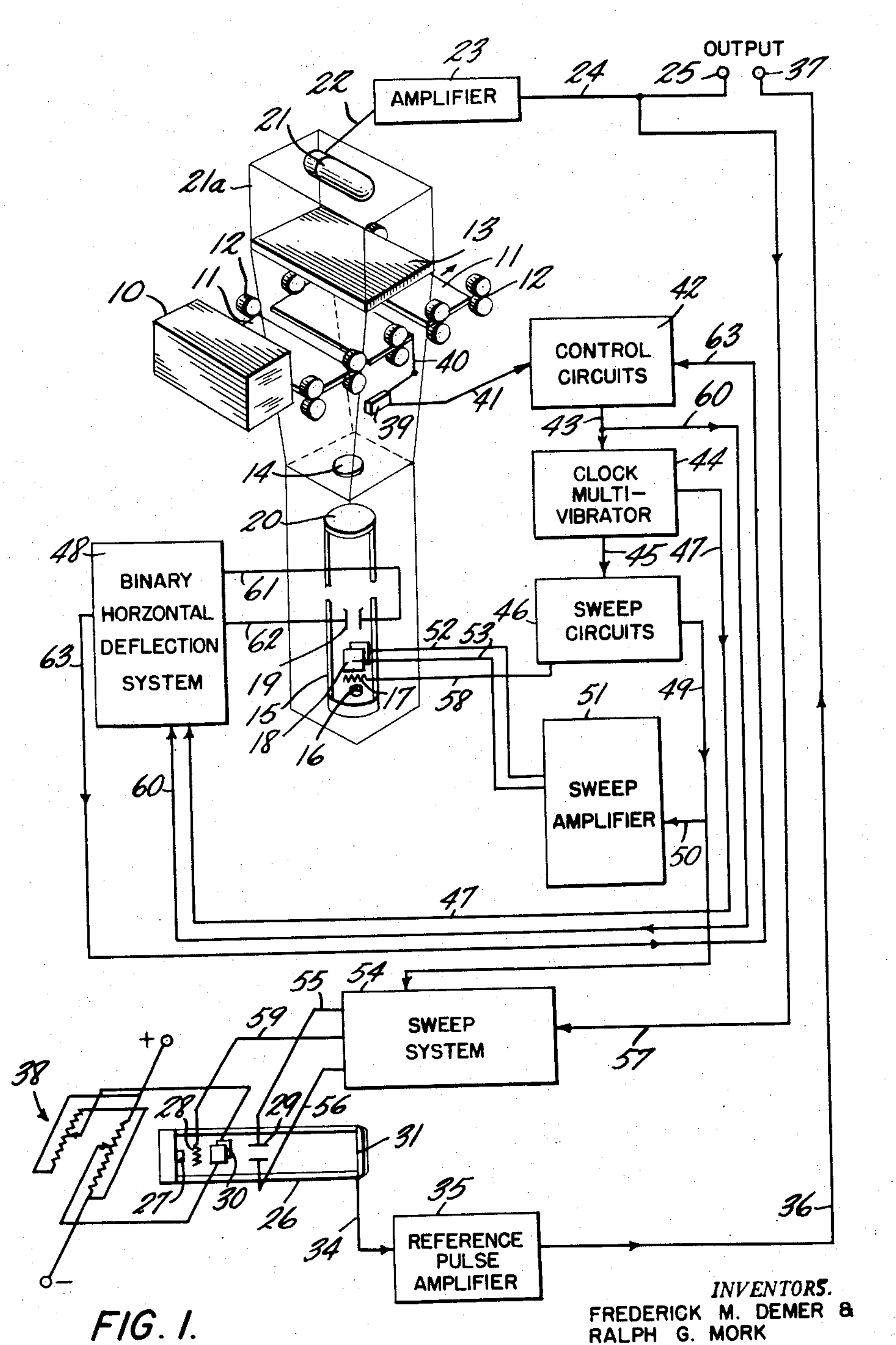
Figure 1 is a schematic circuit diagram in block form illustrating a card reading system in accordance with the present invention.

Referring to an illustrative embodiment of the invention in detail with particular reference to Figure 1, a container 10 discharges punched record cards 11 to conveying mechanism diagrammatically illustrated by pairs of rolls 12. The punched cards 11 are carried between a light diffusing element 13 and a diagrammatically shown lens system 14, the latter being positioned in front of a reading tube 15 comprising a high intensity projection type cathode ray tube.

The reading tube 15 includes an electron gun 16, a control or blanking grid 17, vertical and horizontal deflection plates 18 and 19, respectively, and a fluorescent screen 20. The electron beam generated by the gun 16 will, when impinging on the screen 20, generate a spot of light which, in the absence of the cards 11, will impinge on a conventional photosensitive element such as a photoelectric cell 21. The light diffusing element 13 cooperates with the lens 14 to insure that the light rays generated on any portion of the screen 20 will substantially equally energize the phototube 21. Preferably, the foregoing elements, with the exception of the container 10, are disposed in a diagrammatically illustrated light tight enclosure 21a which is constructed to permit the cards 11 to pass therethrough.

Video signals generated in the phototube 21, in response to changes in the intensity of the light rays impinging thereon, are applied through a cable 22 to a video amplifier 23. The output signals from the amplifier 23 are carried by a cable 24 to an output terminal 25.

A cathode ray tube 26, termed a reference pulse generating tube may, for example, take the form of the conventional monoscope type of cathode ray tube. It consists of a conventional electron gun 27, a control or blanking grid 28, vertical and horizontal deflection plates 29 and 30, respectively, and a target 31 shown in detail in Figure 3, which carries vertical columns of metallic inserts 32. These are electrically joined in any desired manner, conductors 33 being used in Figure 3 for illustrative purposes, and connected to an output signal cable 34 which leads to a reference pulse amplifier 35. Output pulses are supplied therefrom through a cable 36 to another output terminal 37.

The central column of metallic inserts 32 is utilized with the conventional IBM code and the remaining columns may be useful in other instances. In order to permit the use of the three columns, a biasing control network 38 may be adjusted to provide appropriate voltages to the horizontal deflection plates 30.

Positioned in the enclosure 21a is a switch 39 operated by a diagrammatically illustrated arm 40, the leading edge of each one of the cards 11 actuating the arm 40. The switch 39 is tied by a cable 41 into control circuits 42 which initiate, through a cable 43, the operation of a clock multivibrator 44 which comprises a free running or astable multivibrator timing the entire reading system. Pulses from the clock multivibrator 44 are furnished through a cable 45 to sweep circuits 46, and through a cable 47 to a binary horizontal deflection system 48. The sweep circuits 46 control, through cables 49 and 50, a sweep amplifier 51 which provides via conductors 52 and 53 a vertical sweep in the cathode ray tube 15. Signals furnished through the cable 49 to a sweep system 54 are amplified and applied through conductors 55 and 56 to the vertical deflection plates of the cathode ray tube 26.

Video signals supplied from the amplifier 23 through the cable 24 and a cable 57 to the sweep system 54 delay the start of the vertical sweep in the tube 26 until such time as the leading edge of one card 11, being scanned by the reading tube 15, is encountered by the light ray produced by the luminous spot on the screen 20.

The grids 17 and 28, normally blanking the tubes 15 and 26, selectively receive unblanking signals from the sweep circuits 46 and the sweep system 54, respectively, supplied thereto by cables 58 and 59.

The control circuits 42 also supply through the cable 43 and a cable 60 impulses to the binary horizontal deflection system 48 which, through conductors 61 and 62, laterally shifts the electron beam in the tube 15 so that each of the eighty columns, if conventional IBM record cards are utilized, found on the cards 11 are sequentially scanned. After a predetermined count is reached by the system 48, an impulse is supplied therefrom through a cable 63 to the control circuits 42 to deactuate the reading system.

In a typical operation of this embodiment of the invention, each of the record cards 11 carries eighty columns selectively provided with punched holes corresponding to the information stored thereon. These cards 11 are conveyed as shown in Figure 1 into engagement with the switch arm 40. The resulting operation of the switch 39 initiates scanning of one of the cards 11 by a light emitting spot on the fluorescent screen 20.

Figures 2, 3:
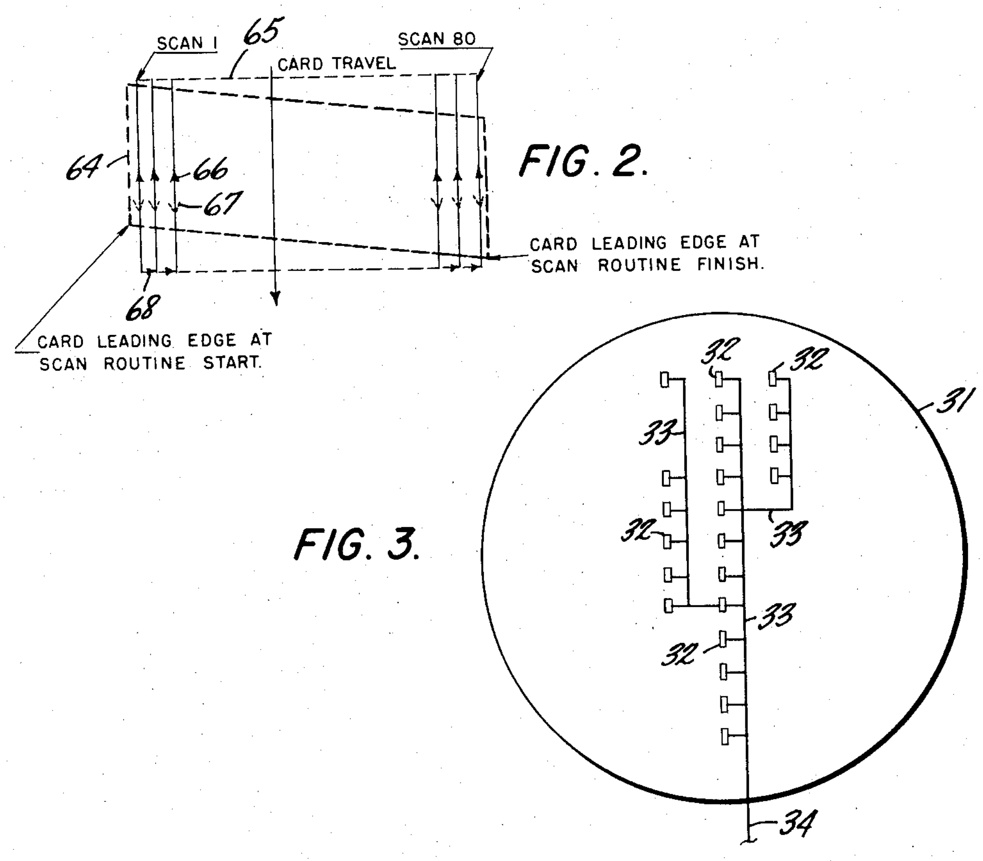
Figure 2 illustrates a raster developed in one of the cathode ray tubes employed in the system illustrated in Figure 1.
Figure 3 is a plan view of a mask employed on another of the cathode ray tubes employed in Figure 1.

Referring to Figure 2, a diagrammatic representation of the scan raster and card travel demonstrates the problems involved in reading information from the cards 11. Broken line 64 illustrates the displacement of one of the rapidly moving cards 11 during the time it takes for the electron beam produced by the gun 16 to scan eighty times. Therefore, the raster must be large enough to accommodate such card movement, this raster being defined by broken line 65. Solid arrowheads 66 indicate the direction of travel of the scan while dotted arrowheads 67 represent the retrace. The stepping of the electron beam by means of the binary horizontal deflection system 48 at the end of each retrace is indicated by arrowheads 68.

Actuation of the switch 39 causes the control circuits 42 to initiate operation of the clock multivibrator 44. The sweep circuits 46 respond to the leading edge of the clock pulses to produce a sweep which is applied through the sweep amplifier 51 to the tube 15 and to the sweep system 54 which subsequently applies it to the tube 26. In addition, the binary horizontal deflection system 48 responds to the trailing edge clock pulses to provide a stepped voltage to the horizontal deflection plates 19 of the tube 15, this action resulting in sequential scanning of the columns on the record cards 11.

As will be evident from an inspection of Figure 2, there are varying time intervals between the initiation of each scan and its impingement on the leading edge of one of the cards 11. However, for proper timing of the reference pulses, the scan of the electron beam in the tube 26 must always be initiated the instant the scan of the tube 15 engages the leading edge of the card 11. This is achieved by utilizing the video signal generated by the phototube 21 when the scan encounters the leading edge of the card 11. This signal is supplied through the cables 24 and 57 to the sweep system 54 to start the scan in the tube 26 at the instant the scan in the tube 15 engages the leading edge of the card 11. Accordingly, the electron beam in the tube 26 by crossing the metallic inserts 32 generates reference pulses, one of these pulses being furnished to the output terminal 37 each time the scan in the tube 15 traverses an index point on one of the cards 11. This type of output signal is useful in many conventional counters.

After the light ray produced by the tube 15 has scanned one of the cards 11 eighty times, the binary horizontal deflection system 48 generates a signal which is supplied to the control circuits 42 through the cable 63, the circuits 42 responding by blocking the clock multivibrator 44 and resetting a binary counter (discussed hereinafter) found in the binary horizontal deflection system 48. The reading system is then ready to scan a subsequent one of the cards 11.

Figures 4, 6:
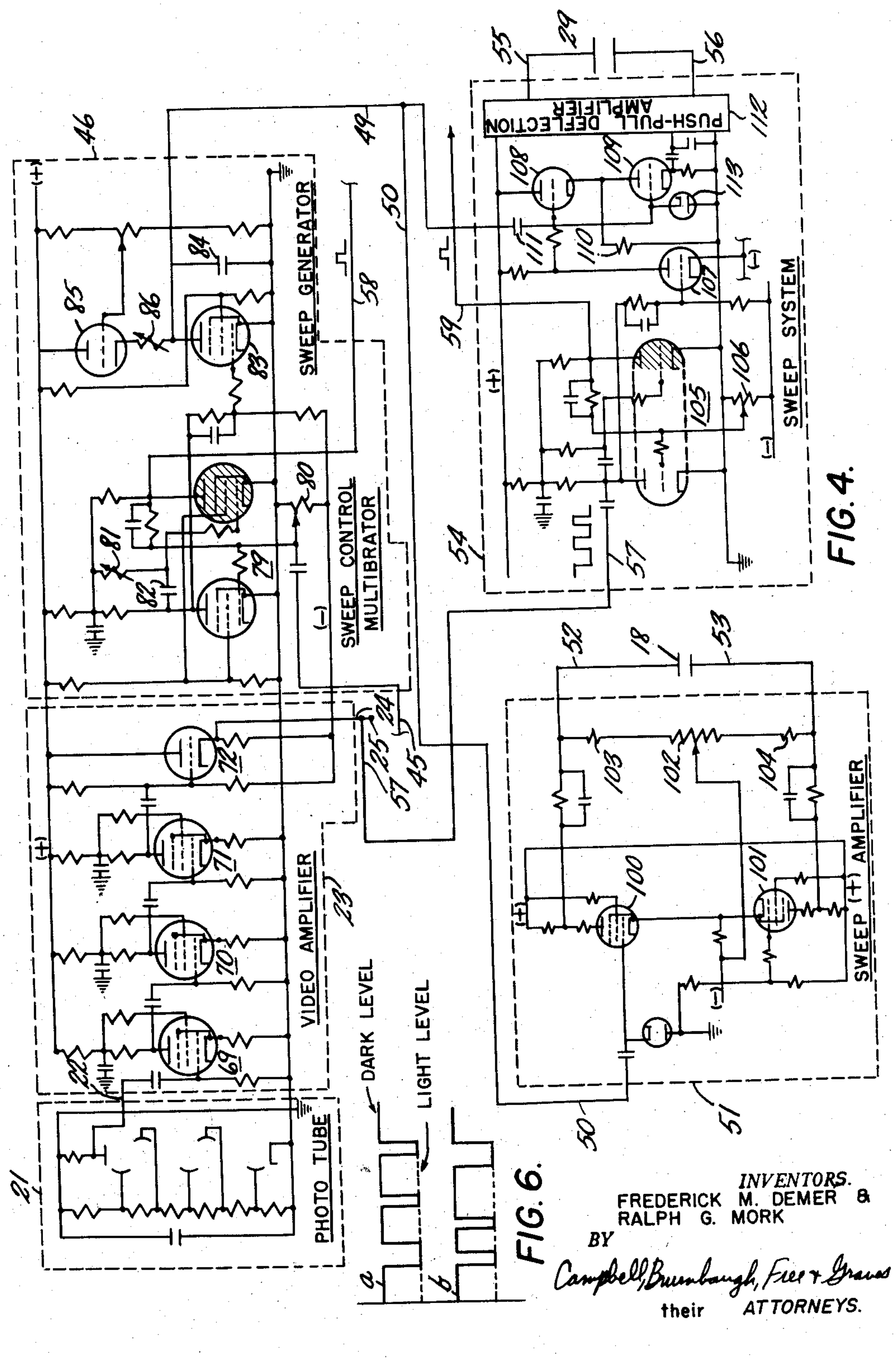
Figure 4 is a schematic circuit diagram illustrating exemplary circuitry that may be employed in connection with the system of Figure 1.
Figure 6 illustrates a pair of video signals generated by a photoelectric tube employed with the one cathode ray tube illustrated in Figure 1.

Examining more particularly exemplary circuitry that may be employed in the blocks illustrated in the schematic block diagram in Figure 1, the photoelectric cell 21 is represented by a conventional multiplier type phototube generating signals such as those illustrated in Figure 6. A signal *a* is typical of those signals derived during one of the early scans in the raster illustrated in Figure 2, the dark and light levels being designated for clarity. Since the tube 15 is normally blanked, the initial portion of the signal *a* is at the dark level, the signal falling abruptly as the tube 15 is unblanked and the sweep started because one of the cards 11 has not yet been encountered. The first rise towards the dark level is caused by the leading edge of one of the cards 11, the signal remaining at that level until such time as an index hole is encountered. The central negative going excursion is caused by light reaching the phototube through a hole in the card 11, the final negative going section of the signal *a* resulting from the spot image passing beyond the upper edge of the card. The dark level is resumed when the scan is complete and the tube blanked.

The lower signal *b* results from a later scan and it will be noted that the first rise towards the dark level indicative of the leading edge of the card 11 occurs somewhat earlier. Of course, the last negative excursion as the scan leaves the card also occurs earlier, this being clear from the representation in Figure 2 of a typical raster superimposed on the area through which one of the cards 11 moves during one complete scan routine.

The video amplifier 23 includes three conventional stages 69, 70 and 71 and a cathode follower 72 for supplying the phototube signals to the upper terminal 25 through the conductor 24. This signal is also coupled through the cable 57 to the sweep system 54, to be described in detail hereinafter.

Figure 5:
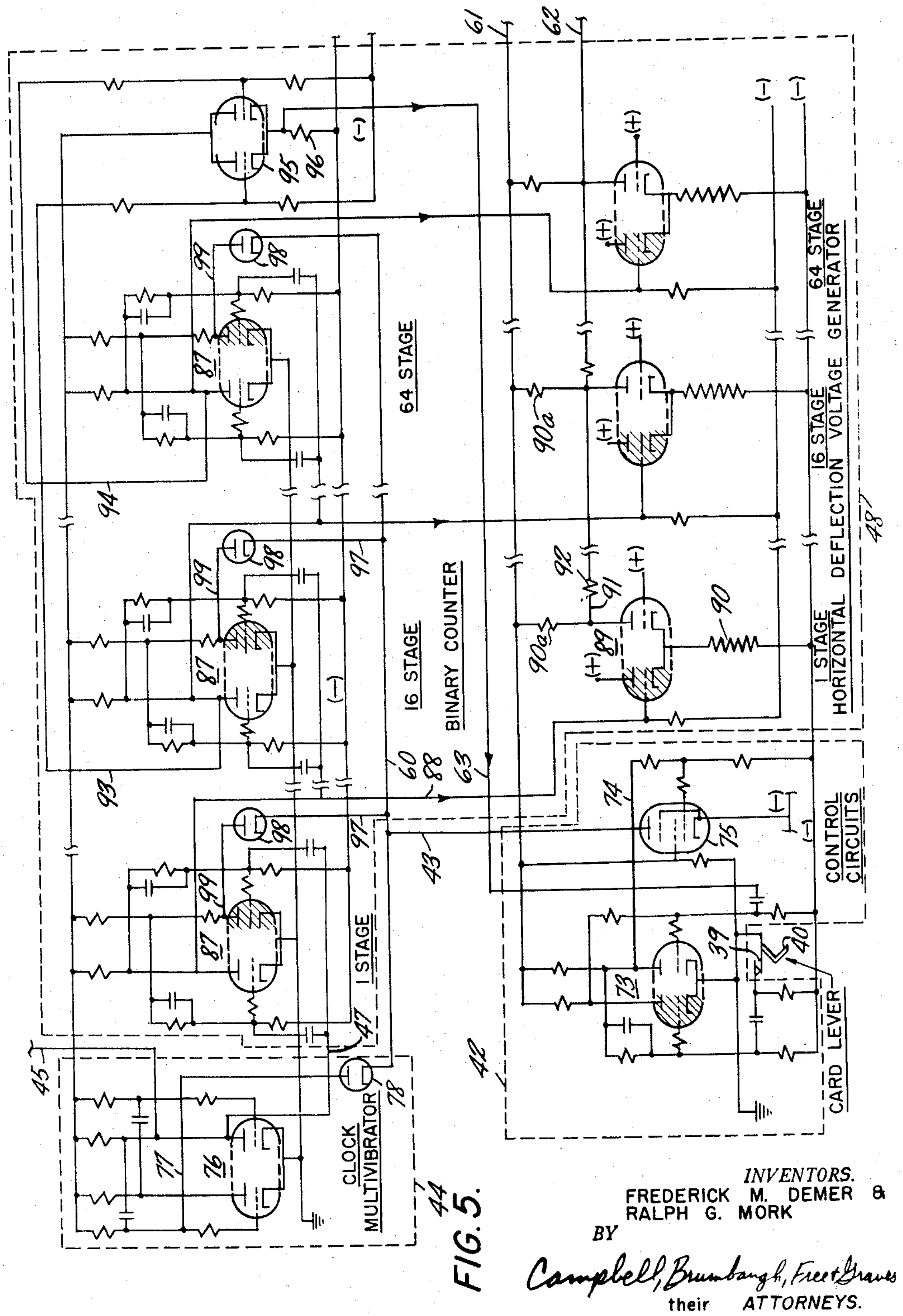
Figure 5 is a schematic circuit diagram illustrating exemplary circuitry which cooperates with the circuits of Figure 4 in the system of Figure 1.

Referring to Figure 5, which must be considered along with Figure 4, the control circuits 42 include a conventionally connected bistable multivibrator 73 turned "on" (right side conducting) the instant one of the cards 11 engages the switch arm 40 to open the switch 39. Thus, the switch operation results in the application of a negative pulse to the grid of the left triode of the multivibrator 73. Since the multivibrator 73 is normally "off," the plate of the right tube will be at a high potential which is coupled through a conductor 74 to the grid of a pentode 75. Current is drawn by the tube 75 through the cable 43 to block the clock multivibrator 44. Examining this latter circuit, it comprises a free running or stable multivibrator 76 formed by a pair of conventionally connected triodes, the grid resistance in the left tube being connected through a conductor 77, a diode 78 and the cable 43 to the pentode 75. Therefore, when the pentode 75 conducts, the left side of the multivibrator 76 is cut off.

It will be recalled that the engagement of one of the cards 11 with the switch 40 turns the multivibrator 73 "on." The plate of the left tube is therefore driven in a negative direction to cut off the pentode 75 which unblocks the clock multivibrator 44. The first oscillation of the multivibrator 76 serves to cut off its right side, the resultant rise in plate potential being coupled through the cable 45 to a sweep control monostable multivibrator 79 in the sweep circuits 46. The grid of the left tube of the multivibrator 79 is biased by a potentiometer 80 to be nonconducting normally, the positive pulse from the cable 45 causing the monostable multivibrator 79 to shift operation. The duration of the foregoing shift is determined by the values of a variable resistor 81 and a condenser 82. It is preferably less than the duration of the clock pulses.

Normally, the plate voltage of the left tube of the multivibrator 79 biases the grid of a pentode 83 in a sweep generator, included in the sweep circuits, sufficiently high to cause conduction thereof. However, operation of the sweep control multivibrator 79 cuts off the pentode 83 to permit a sweep capacitor 84 to be charged through a cathode follower 85 and adjustable resistor 86. The voltage across the capacitor 84 rises linearly by virtue of the constant current through the cathode follower 85 and this constitutes the sweep voltage. It should be noted that the start of this sweep is concurrent with the cut off of the right side of the sweep multivibrator 79, so that the rise in plate potential of this tube may be employed as an unblanking pulse, these pulses being supplied on the cable 58 to the grid 17 of the tube 15.

A typical circuit arrangement for providing the vertical scan in the tube 15 has been described above. It is also necessary to step the electron beam horizontally in order to sequentially scan each one of the eighty columns found on a typical IBM record card. One form of circuitry for achieving this function is illustrated in Figure 5, this being broadly designated the binary horizontal deflection system 48.

As explained above, actuation of the switch 39 by the leading edge of one of the cards 11 results in the unblocking of the clock multivibrator 44. The first shift in oscillation of this circuit results in the right tube being cut off which provides an increase in potential at the plate. After a predetermined interval, the free running multivibrator 76 will again shift operation and the plate of the right tube will go negative, this negative pulse being coupled through the cable 47 to a stage representing 1 in a binary counter included in the deflection system 48. The binary counter may comprise a seven stage counter including conventional trigger circuits 87 capacitively coupled to produce a binary count of the input pulses to the first stage. The three stages illustrated represent values 1, 16 and 64.

Although the entire pulse on the cable 47 is applied to the binary counter, since this circuit is responsive to negative pulses, it counts only upon receipt of the negative going trailing edges of the clock pulses.

Each stage of the binary counter is connected by a conductor 88 to the left side of a dual triode 89 having its cathodes connected through a common resistor 90 in a cathode follower arrangement. The right triode is coupled to a positive potential through plate resistors 90$a$ of suitable values, a fixed grid voltage being furnished. Therefore, the circuit operates to provide an output of equal voltage steps by virtue of constant equal currents being drawn from specific points of the appropriately constructed resistance network.

More particularly, the counter stages normally bias the left triodes of the tubes 89 positively, the right sides of the counter stages being conductive. Accordingly, in each instance current flows through the left side of the tube 89 and this current, through the common cathode resistor 90, holds the right side of the tube 89 in a nonconducting state. However, when, for example, the 1 counter stage shifts condition, the left side of the tube 89 is biased "off" permitting conduction of a constant current by the right side. The resulting voltage step is coupled through suitable conductors 91 and resistances 92 to provide a stepped output voltage at the output conductors 61 and 62 for application to the horizontal deflection plates 19 of the tube 15. It will be apparent that the value of the count in the binary counter is reflected as a voltage at the network output leads 61 and 62. The voltage steps abruptly in value as the count in the binary counter is altered in value, this alteration being timed to occur between sweeps, as previously described, since the counter operates from the trailing edge of the clock pulses.

In other words, the stepped output voltage produces the horizontal column to column shift of the reading tube luminous spot, it being assumed that the duration of the clock pulses is sufficiently longer than the duration of shift of the monostable multivibrator 79 to permit retrace of the electron beam in the tube 15 prior to the application of the horizontal shift voltage.

As described in connection with the system in Figure 1, after scanning eighty columns of one of the cards 11, the clock multivibrator 44 must be blocked until another card engages the switch arm 40 to initiate the scan routine. This is achieved by respectively joining the plates of the left sides of the 16 and 64 stages of the binary counter through conductors 93 and 94 to the left and right grids of a cathode follower connected dual triode 95 provided with a cathode resistor 96. The cathode voltage of the cathode follower 95 will be high until such time as both the 16 and 64 stages have been shifted in operation. This will occur the instant the count of 80 is reached, the cathode follower 95 being cut off and the negative pulse produced at the cathode of the tube 95 being coupled by the cable 63 to the grid of the left side of the bistable multivibrator 73. This turns this circuit "off" causing conduction of the pentode 75 and blocking the clock multivibrator 44. In addition, the tube 75 draws current through the cable 60, conductors 97, diodes 98 and conductors 99 joined to the plates of the right sides of the triggers 87 found in each stage of the binary counter. This resets the binary counter and readies it for another scan routine.

Figure 7:
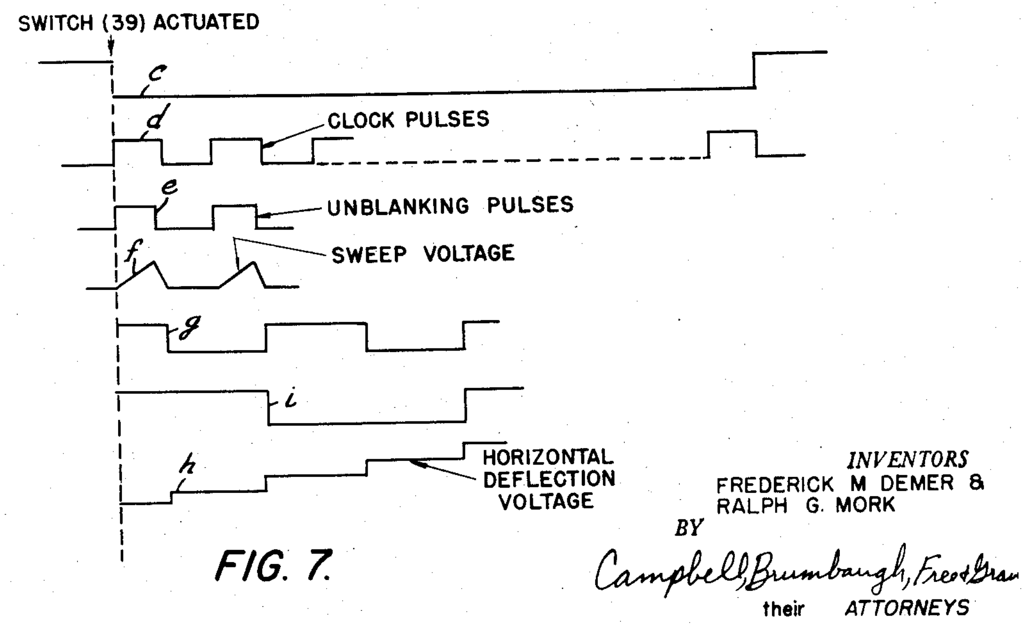
Figure 7 illustrates on a common time axis waveforms of various voltages in the circuitry of Figures 4 and 5.

The waveforms illustrated in Figure 7 aid in understanding the overall operation of the above described circuitry. The zero reference for the time base is the instant the switch 39 is operated by one of the cards 11. Waveform $c$ represent the change in potential at the plate of the right triode of the multivibrator and it is evident that simultaneously with the first negative excursion, the clock pulses $d$ are initiated.

The unblanking pulses $e$ are produced at the plate of the right pentode of the multivibrator 79, the negative counterpart of these pulses being employed to provide a linearly rising sweep voltage $f$. It is apparent that the unblanking pulses are of the same duration as the rise time of the sweep voltage so that the reading tube 15 is blanked during the retrace.

Examining the waveforms useful to an understanding of the binary horizontal deflection system 48, coincident with the trailing edge of the first clock pulse $d$, a negative pulse $g$ is generated at the plate of the left triode in the 1 stage multivibrator 87. This cuts off the left side of the cathode follower 89, the resulting conduction of the right side stepping the voltage across the output leads 61 and 62 as shown by the waveform $h$. When a subsequent negative going trailing edge of one of the clock pulses $d$ is fed to the binary counter, the 1 stage will shift "off" and the following counter stage will shift "on" to furnish a negative pulse $i$ to its corresponding cathode follower 89 in the horizontal deflection voltage generator Due to the choice of resistor values in the ladder network formed by the resistors 90$a$ and 92, the waveform $h$ will step as indicated in Figure 7. Circuitry operating in this manner is conventional and need not be further described.

Returning to Figure 4, the sweep voltage appearing on the cable 49 is capacitively coupled into the sweep amplifier 51, this circuitry including a conventional push-pull amplifier formed by suitably connected pentodes 100 and 101 and a positioning adjustment. The latter device consists of a potentiometer 102 for varying the D.C. voltage level of the tube plates symmetrically by altering the current through high valued resistors 103 and 104, the sweep voltage being capacitively coupled across the resistors 103 and 104 to the conductors 52 and 53 leading to the vertical deflection plates 18 of the reading tube 15.

The sweep voltage is also coupled through the cable 49 to the sweep system 54 shown in Figure 4. The function of the unit 54 is to delay the start of the reference tube sweep until such time as the image of the spot generated in the tube 15 encounters the leading edge of one of the cards 11. The variations in the time of this encounter have been previously described as has the typical signal generated by the phototube 21.

The sweep system 54 includes a monostable multivibrator 105 biased by a potentiometer 106 to cut off its left side. Accordingly, the first negative going pulse on the cable 57, this being representative of the leading edge of one of the cards 11, cuts off the right side of the multivibrator 105 and causes the left side to conduct. The negaitve going signal produced at the plate of the left triode is applied to the grid of a triode 107, the resulting positive signal at the plate of the tube 107 being furnished to the grid of a further triode 108 connected as a cathode follower. The cathode follower 108 thereupon supplies plate voltage to a cathode follower 109 in series therewith, the tube 109 being inoperative until this instant because its plate has been held at ground potential by means of a cathode resistor 110 of the tube 108.

In view of the foregoing, prior to the application of plate voltage to the tube 109, the sweep voltage on the cable 49, coupled to the grid of the tube 109 through a capacitor 111, is clipped by the diode action of the grid of the tube 109, the output voltage of the cathode follower 109 remaining substantially zero. Moreover, the capacitor 111 is charged to a value equal to the value of the sweep voltage at the instant the first negative going signal is applied to the tube 105 and at this time, plate voltage is applied to the tube 109 and normal cathode follower action is initiated. Accordingly, the impressed sweep voltage on the cable 49 minus the value of the sweep at that particular instant is thereafter transmitted to a push-pull amplifier 112 supplying suitable sweep voltage to the conductors 55 and 56 leading to the vertical deflection plates 29 of the tube 26. A diode 113 connected between the grid of the tube 109 and ground restores the capacitor 111 to its initial voltage value after each sweep.

It will be evident from the above that the sweep voltage applied to the vertical deflection plates 29 will be synchronized with the sweep voltage applied to the vertical deflection plates 18 of the tube 15 since it is derived from the same sweep generator.

Although the invention has been described with reference to record cards, it will be apparent that other similar data storage devices are within the scope of this system. In addition, it will be understood that the above described embodiments of the invention are illustrative only and modifications thereof will occur to those skilled in the art. For example, other pulse generators suitable for producing pulses in synchronism with each scan of a group of index points on the cards 11 may be employed in the invention. In addition, data in the form of reflecting surfaces or translucent inserts may be used on the record cards 11 in place of the holes therein providing the light sensitive means and a lens system therefor is suitably repositioned. Therefore, the invention is not to be limited to the specific apparatus disclosed herein but is to be defined by the appended claims.

We claim:

1. In data bearing record reading apparatus, means for generating a radiant energy beam, light sensitive means for generating signals in response to changes in intensity of said beam, means for continuously moving said record along a path permitting said beam to impinge thereon, scanning means for repeatedly sweeping said beam across said moving record in a predetermined pattern extending beyond the leading edge of the record for varying the intensity of the beam impinging on said light sensitive means in accordance with the data stored on the record, pulse generating means for generating a predetermined number of reference pulses during each sweep of said beam across said record, means responsive to the arrival of the record to be scanned at a selected position for initiating operation of said scanning means, and means responsive to the signals generated by the change in intensity of said beam when encountering the leading edge of said record for initiating operation of said pulse generating means.

2. In data bearing record reading apparatus, means for generating a radiant energy beam, light sensitive means selectively illuminated by said beam for generating signals in response to changes in intensity of said beam, conveying means for continuously moving said record between said beam and said light sensitive means, scanning means for repeatedly sweeping said beam across said moving record in a predetermined pattern extending beyond the leading edge of the record for varying the intensity of the beam impinging on said light sensitive means in accordance with the data stored on the record, pulse generating means for generating a predetermined number of reference pulses during each sweep of said beam across said record, means actuated by the record to be scanned upon its arrival at a selected position for initiating operation of said scanning means, and means responsive to the signals generated when the leading edge of said record blocks the beam from the light sensitive means for initiating operation of said pulse generating means.

3. In data bearing record card reading apparatus, means for generating a radiant energy beam, means for continuously moving said card in a path permitting said beam to impinge thereon, a scanning means for repeatedly sweeping said beam across said moving record card against its direction of movement in a predetermined pattern extending beyond the leading edge of the card for varying the intensity of the beam impinging on said light sensitive means in accordance with the data stored on the card, means actuated by the record card to be scanned upon its arrival at a selected position for initiating operation of said scanning means, light sensitive means responsive to variations in the intensity of said beam for generating signals, pulse generating means for generating a predetermined number of reference pulses during each sweep of said beam across said card, and means responsive to the signals generated when said beam encounters the leading edge of said card for initiating operation of said pulse generating means so that said beam begins each traverse of said card simultaneously with the initiation of reference pulse generation.

4. In data bearing record reading apparatus, means for generating a radiant energy beam, means for continuously moving said record along a path permitting said beam to impinge thereon, scanning means for repeatedly sweeping said beam across said moving record in a predetermined pattern extending beyond the leading edge of the record for varying the intensity of the beam impinging on said light sensitive means in accordance with the data stored on the record, means actuated by the record to be scanned upon its arrival at a selected position for initiating operation of said scanning means, light sensitive means responsive to variations in the intensity of said beam for generating signals, pulse generating means for generating a predetermined number of reference pulses during each sweep of said beam across said record, means for synchronously operating said pulse generating means and said scanning means so that the occurrence of said reference pulses bears a predetermined time relation to the position of said beam as it sweeps across said record, and means responsive to the signals generated when said beam encounters the leading edge of said record for initiating operation of said pulse generating means.

5. In data bearing record card reading apparatus in which the card contains data stored at index points arranged in columns, a cathode ray tube including means for generating a ray of light by focusing an electron beam on a fluorescent screen, light sensitive means for generating signals in response to changes in the intensity of said light ray, a conveying device for continuously moving said card in front of said screen to vary the intensity of the light ray impinging on said light sensitive means, scanning means for deflecting said electron beam to sweep repeatedly said light ray across said moving card in a predetermined pattern extending beyond the leading edge of the card for varying the intensity of the light ray impinging on said light sensitive means in accordance with the data stored on the card, said pattern including the columns of index points, means responsive to the arrival of the record card at a selected position for initiating operation of the scanning means, pulse generating means for generating a predetermined number of reference pulses during each scan of said light ray across said card, means for synchronously operating said scanning means and said pulse generating means so that the occurrence of said reference pulses bears a predetermined time relation to the position of said beam as it sweeps across said card, and means responsive to the signals generated when the leading edge of the card to be scanned blocks the light ray from said light sensitive means for initiating operation of said pulse generating means.

6. Apparatus as defined in claim 5 wherein means are provided for blanking said beam and disabling said pulse generating means during retrace of said beam after each sweep along one of the groups of index points.

7. Apparatus for reading cards containing data stored at index points arranged in groups, means for generating a radiant energy beam, light sensitive means for generating signals in response to changes in intensity of said beam, means for moving said cards sequentially along a path permitting said beam to impinge thereon, scanning means for sweeping said beam across said cards along the groups of index points in a predetermined pattern extending beyond the leading edges of said cards for varying the intensity of the beam impinging on said light sensitive means in accordance with the data stored on the cards, said light sensitive means generating a first signal when said beam traverses a data containing index point and a second signal when said beam encounters the leading edge of one of said cards, pulse generating means for generating a predetermined number of reference pulses during each sweep of said beam across one of said cards, and means responsive to said second signals for initiating operation of said pulse generating means so that each of said first signals occurs simultaneously with one of said reference pulses.

8. Apparatus as defined in claim 7 wherein means are provided for blanking said beam and disabling said pulse generating means during the retrace of said beam after each sweep along one of the groups of index points.

9. In apparatus for reading cards containing data stored at index points arranged in columns, means for generating a radiant energy beam, light sensitive means selectively illuminated by said beam for generating signals in response to changes in intensity of said beam, means for sequentially moving said cards on an axis defined by one of said columns along a path permitting said beam to impinge thereon, scanning means for sweeping said beam across said cards against their direction of movement and along the columns of index points in a predetermined pattern extending beyond the leading edges of the cards for varying the intensity of the beam impinging on said light sensitive means in accordance with the data stored on the cards, said light sensitive means generating a first signal when said beam traverses a data containing index point and a second signal when said beam encounters the leading edge of one of said cards, pulse generating means for generating a number of reference pulses equal to the number of index points in a column during each sweep of said beam along one of said columns, and means responsive to said second signals for initiating operation of said pulse generating means so that each of said first signals occurs simultaneously with one of said reference pulses.

10. Apparatus as defined in claim 9 wherein means are provided for blanking said beam and disabling said pulse generating means during retrace of said beam after each sweep across one of the columns of index points.

11. In apparatus for reading record cards containing data stored at index points arranged in groups, means for generating a ray of light by focusing an electron beam on a fluorescent screen, light sensitive means selectively illuminated by said light ray for generating signals in response to changes in intensity of said light ray, a conveying device for sequentially and continuously moving said cards between said screen and said light sensitive means, scanning means for deflecting said electron beam to scan the groups of index points on said moving cards with said light ray in a predetermned pattern extending beyond the leading edges of the cards for varying the intensity of the light ray impinging on said light sensitive means in accordance with the data stored on the cards, said light sensitive means generating an information signal when said light ray traverses a data containing index point, pulse generating means for generating a number of reference pulses corresponding to the number of index points traversed in each sweep of said light ray, and means responsive to the signals generated by the change in intensity of said light ray when encountering the leading edges of said cards for initiating operation of said pulse generating means.

12. Apparatus as defined in claim 11 wherein means are provided for blanking said beam generating means and disabling said pulse generating means during the retrace of said beam after each sweep across one of the groups of index points.

13. In apparatus for reading record cards containing data stored at index points arranged in adjacent parallel columns, means for generating a ray of light by focusing an electron beam on a fluorescent screen, light sensitive means selectively illuminated by said light ray for generating signals in response to changes in intensity of said light ray, a conveying device for sequentially moving said cards between said screen and said light sensitive means, scanning means for deflecting said electron beam to scan the columns of index points with said light ray in a predetermined pattern extending beyond the leading edges of the cards for varying the intensity of the light ray impinging on said light sensitive means in accordance with the data stored on said cards, means actuated by each of the record cards upon its arrival at a selected position for initiating operation of said scanning means, said light sensitive means generating an information signal when said light ray traverses a data containing index point, pulse generating means operating synchronously with said scanning means during each sweep of the light ray along a column for generating a reference pulse each time the light ray traverses one index point, and means responsive to the signals generated by the change in intensity of said light ray when encountering the leading edges of said cards for initiating operation of said pulse generating means.

14. In apparatus for reading record cards containing data stored at index points arranged in columns, means for generating a radiant energy beam, light sensitive means for generating signals in response to changes in intensity of said beam, means for sequentially and continuously moving said record cards along a path permiting said beam to impinge thereon, scanning means for sweeping said beam across said moving record cards along the columns of index points for varying the intensity of the beam imping on said light sensitive means in accordance with the data stored on said cards, means responsive to the arrival of the record cards at a selected position for initiating operation of said scanning means, and means for controlling said scanning means to shift the beam after one of said sweeps from alignment with one column of index points on the card being scanned to alignment with another column of index points.

15. In apparaus for reading cards containing data stored at index points arranged in adjacent groups, means for generating a radiant energy beam, light sensitive means for generating signals in response to changes in intensity of said beam, means for moving said cards sequentially along a path permitting said beam to impinge thereon, scanning means for sweeping said beam along the groups of index points in a predetermined pattern extending beyond the leading edges of the cards for varying the intensity of the beam impinging on said light sensitive means in accordance with the data stored on the cards, said light sensitive means producing a first signal when said beam traverses a data containing index point, means controlling said scanning means for causing each successive sweep of said beam to progress to the next adjacent group of index points, pulse generating means for generating a number of reference pulses during each sweep of said beams along one group of said index points, and means responsive to the signals generated by the change in intensity of said beam when encountering the leading edge of one of said cards for initiating operation of said pulse generating means to provide one of said reference pulses each time said beam traverses an index point.

16. Apparatus as defined in claim 15 wherein means are provided for blanking said beam and disabling said pulse generating means during retrace of said beam after each sweep across one of the groups of index points.

17. In apparatus for reading cards containing data stored at index points arranged in adjacent parallel columns, means for generating a radiant energy beam, light sensitive means for generating signals in response to changes in intensity of said beam, means for moving said cards on an axis defined by one of said columns along a path permitting said beam to impinge thereon, scanning means for sweeping said beam across said cards against their direction of movement and along the columns of index points in a predetermined pattern extending beyond the leading edges of the cards for varying the intensity of the beam impinging on said light sensitive means in accordance with the data stored on the cards, said light sensitive means generating a first signal when said beam traverses a data containing index point and a second signal when said beam encounters the leading edge of one of said cards, means controlling said scanning means for causing each successive sweep of said beam to progress to the next adjacent column of index points, pulse generating means for generating a number of reference pulses equal to the number of index points in a column during each sweep of said beam along one of said columns, and means responsive to said second signals for initiating operation of said pulse generating means so that each of said first signals occurs simultaneously with one of said reference pulses.

18. Apparatus as defined in claim 17 wherein means are provided for blanking said beam and disabling said pulse generating means during retrace of said beam after each sweep across one of the selected columns of index points.

19. In apparatus for reading record cards containing data stored at index points arranged in adjacent parallel columns, means for generating a ray of light by focusing an electron beam on a fluorescent screen, light sensitive means selectively illuminated by said light ray for generating signals in response to changes in intensity of said light ray, a conveying device for sequentially moving said cards between said screen and said light sensitive means, scanning means for deflecting said electron beam to scan the columns of index points with said light ray in a predetermined pattern extending beyond the leading edges of the cards for varying the intensity of the beam impinging on said light sensitive means in accordance with the data stored on said cards, said light sensitive means generating an information signal when said light ray traverses a data containing index point, means controlling said scanning means for causing each successive sweep of said beam to progress to the next adjacent column of index points, pulse generating means for generating a number of reference pulses corresponding to the number of index points traversed in each sweep of said light ray, and means responsive to the signals generated by the change in intensity of said light ray when encountering the leading edges of said cards for initiating operation of said pulse generating means to provide one of said reference pulses each time said beam traverses one index point.

20. Apparatus as defined in claim 19 wherein said scan controlling means comprises means for deflecting the electron beam normal to its sweep direction, a binary counter receiving a signal for each sweep of said electron beam, and means responsive to each value change in the counter for varying by a predetermined increment the energization of said deflection means to progress the light ray to the next adjacent column of index points.

References Cited in the file of this patent

UNITED STATES PATENTS

| | | |
|---|---|---|
| 2,302,009 | Dickinson | Nov. 17, 1942 |
| 2,401,021 | Rosenberg et al. | May 28, 1946 |
| 2,575,034 | Tyler et al. | Nov. 13, 1951 |
| 2,586,963 | Knutsen | Feb. 26, 1952 |